(12) United States Patent
Wright et al.

(10) Patent No.: US 12,514,269 B2
(45) Date of Patent: Jan. 6, 2026

(54) BEE NUTRITION

(71) Applicant: APIX BIOSCIENCES BIOSCIENCES NV, Wingene (BE)

(72) Inventors: Geraldine Wright, Newcastle Upon Tyne (GB); Sharoni Shafir, Jerusalem (IL); Sue Nicolson, Pretoria (ZA); Phil Stevenson, London (GB)

(73) Assignee: APIX BIOSCIENCES BIOSCIENCES NV, Wingene (BE)

( * ) Notice: Subject to any disclaimer, the term of this patent is extended or adjusted under 35 U.S.C. 154(b) by 100 days.

(21) Appl. No.: 17/828,498

(22) Filed: May 31, 2022

(65) Prior Publication Data

US 2022/0361531 A1    Nov. 17, 2022

Related U.S. Application Data

(62) Division of application No. 15/776,371, filed as application No. PCT/GB2016/053573 on Nov. 16, 2016, now Pat. No. 11,382,344.

(30) Foreign Application Priority Data

Nov. 16, 2015 (GB) ...................... 1520144

(51) Int. Cl.
| | | |
|---|---|---|
| *A23K 50/90* | (2016.01) | |
| *A23K 20/105* | (2016.01) | |
| *A23K 20/111* | (2016.01) | |
| *A23K 20/147* | (2016.01) | |
| *A23K 20/158* | (2016.01) | |
| *A23K 20/163* | (2016.01) | |
| *A23K 20/168* | (2016.01) | |
| *A23K 20/174* | (2016.01) | |
| *A23K 20/20* | (2016.01) | |

(52) U.S. Cl.
CPC ............ *A23K 50/90* (2016.05); *A23K 20/105* (2016.05); *A23K 20/111* (2016.05); *A23K 20/147* (2016.05); *A23K 20/158* (2016.05); *A23K 20/163* (2016.05); *A23K 20/168* (2016.05); *A23K 20/174* (2016.05); *A23K 20/20* (2016.05)

(58) Field of Classification Search
None
See application file for complete search history.

(56) References Cited

U.S. PATENT DOCUMENTS

| | | | |
|---|---|---|---|
| 2,695,829 A | 11/1954 | Martinez | |
| 4,386,107 A | 5/1983 | Vrignaud | |
| 5,900,244 A | 5/1999 | Howse | |
| 2004/0175447 A1 | 9/2004 | Murao | |
| 2006/0148348 A1 | 7/2006 | Cohen | |
| 2006/0148378 A1* | 7/2006 | Cohen .................. | A23K 50/90 449/2 |
| 2006/0159834 A1 | 7/2006 | Shibuya | |
| 2012/0308686 A1* | 12/2012 | Wardell ................. | A23L 33/185 426/62 |
| 2017/0251700 A1 | 9/2017 | Doane | |

FOREIGN PATENT DOCUMENTS

| | | |
|---|---|---|
| AU | 6103694 | 8/1994 |
| CN | 101011114 | 8/2007 |
| CN | 104222623 | 12/2014 |
| CN | 104222626 | 12/2014 |
| EP | 2949220 | 12/2015 |
| WO | 94/17674 | 8/1994 |

OTHER PUBLICATIONS

Bob's Red Mill Nutritional Yeast, published at least by Jun. 15, 2015 at: https://www.bobsredmill.com/nutritional-yeast.html, as evidenced by the Comment titled: Opaque package for nutritional yeast to preserve Riboflavin, on that same date. (Year: 2015).*
Cohen: WO2006073955A2, published on Jul. 13, 2006 (Year: 2006).*
Chami: WO2014104868, published Jul. 3, 2014. (Year: 2014).*
Margaoan: Predominant and Secondary Pollen Botanical Origins Influence the Carotenoid and Fatty Acid Profile in Fresh Honeybee-Collected Pollen; J. Agric. Food Chem. 2014, 62, 6306-6316 (Year: 2014).*
Ramm: WO1994017674A1 An improved bee food and method of feeding published on Aug. 18, 1994. (Year: 1994).*
Avni: Nutritional aspects of honey bee-collected pollen and constraints on colony development in the eastern Mediterranean; Journal of Insect Physiology; available online Jul. 16, 2014. (Year: 2014).*
Ma: Nutritional Effect of Alpha-Linolenic Acid on Honey Bee Colony Development (*Apis mellifera* L.); J. Apic. Sci. Vol. 59 No. 2 2015. (Year: 2015).*
Manning: The modified teaching, in the combination of Ma and Manning, provides the fatty acids are obtained from separate sources in predetermined amounts; Murdoch University, School of Biological Sciences; Doctorate Thesis; Jul. 2006. (Year: 2006).*
Marshal: Soybean sterol composition and utilization by Phytophthora sojae; Phytochemistry 58 (2001) 423-428 (Year: 2001).*
Svoboda: Sterol utilization in honey bees fed a synthetic diet: Effects on brood rearing; Journal of Insect Physiology, vol. 26, Issue 5, 1980, pp. 287-289. (Year: 1980).*
Masami: published as JP H05-76253 A, on Mar. 30, 1993. (Year: 1993).*
DV: Del Vecchio: published as WO 2013/030854 on Mar. 7, 2013 (Year: 2013).*
Berkshire: Product information bulletin: 28.5% Whole Dry Milk; published Oct. 19, 2009. (Year: 2009).*

(Continued)

*Primary Examiner* — Patricia A George
(74) *Attorney, Agent, or Firm* — Jerold I Schneider; SCHNEIDER IP LAW

(57) ABSTRACT

A method for increasing bee performance by administering pollen substitutes to bees where the pollen substitute includes sources of proteins, fatty acids and carbohydrates.

20 Claims, 7 Drawing Sheets

(56) References Cited

OTHER PUBLICATIONS

Mansson: Fatty acids in bovine milk fat; Food and Nutrition Research; vol. 54, 2010. (Year: 2010).*
Svoboda: Comparison of Sterols of Pollens, Honeybee Workers, and Prepupae From Field Sites; Archives of Insect Biochemistry and Physiology 25-31 (1983) (Year: 1983).*
Warriner: Texas Master Gardeners Association: The secret of bumblebees; published online at least by May 14, 2013 © https://web.archive.org/web/20130514100223/http://txmg.org/resources/pollinators/the-secret-life-of-bumblebees/ (Year: 2013).*
International Preliminary Report on Patentability PCT/GB2016/053573.
International Search Report and Written Opinion PCT/GB2016/053573.
Lutein, Zeaxanthin and Eye Health dated May 2011 downloaded from www.eggnutritioncenter.org/articles/lutein-zeaxanthin-and-eye-health.
Cseke et al Natural Product Communications vol. 2, No. 12 2007 pp. 1317-1336 (2007).
Bernacchia et al Austin J Nutri Food Sci 2014.2(8) 1045 (2014).
Haydak, Annual Review of Entomology 1970 15:1, 143-156 (1970).
Dubois et al Eur. J. Lipid Sci Technol 109 (2007) 710-732.
Manning, Fatty Acid Composition of Popllen and the Effect of Two Dominant Fatty Acids . . . beginning to p. 100, Jul. 2006.
Manning, Fatty Acid Composition of Popllen and the Effect of Two Dominant Fatty Acids . . . o p. 100 to end, Jul. 2006.
Reinhard et al Chapter 9, The Role of Scents in Honey Bee Foraging and Recruitment, Food Exploitation, Ecological Behavior and Theoretical Approach, p. 155-172 CRC Press, Boca Raton, May 2009.

* cited by examiner

BEE NUTRITION

CROSS-REFERENCE TO RELATED APPLICATIONS

This application is a division of U.S. patent application Ser. No. 15/776,371 filed on May 15, 2018, as the U.S. National Stage of International Patent Application No. PCT/GB2016/053573, filed on Nov. 16, 2016, which claims the benefit of Great Britain Patent Application No. 1520144.5 filed Nov. 16, 2015, the disclosures of each of which are expressly incorporated by reference in their entirety.

FIELD OF THE INVENTION

The present invention relates to compositions, methods and products for providing nutrition to insects such as bees, e.g., honey bees. Certain embodiments of the present invention also relate to methods of providing nutrition to bees e.g., colonies of bees together with methods of preparing a composition for providing nutrition to bees.

BACKGROUND TO THE INVENTION

Domesticated honeybees are important for world agriculture as pollinators of crops. They are also kept for the production of honey, wax, and royal jelly for human use. Commercial beekeeping operations rear millions of colonies every year for transport to areas of intense cultivation of soft fruit and nut crops throughout the world. Commercially-reared bumblebee colonies have been in production for the past 30 years. Bumblebees were domesticated to meet the need for pollination services of glasshouse-grown crops such as tomatoes that require pollination to set fruit. The demand for pollination services has expanded with the need to provide food for the growing world human population.

Historically, honeybee keepers have relied on natural forage for bees provided by floral nectar and pollen to supply the nutrition of their colonies. However, several factors have limited their ability to feed large bee populations required for pollination services. Of greatest impact has been the conversion of natural landscapes with diverse flora to urban or agricultural use, limiting the flowering plants available to feed bee populations. Commercial honeybee keepers transport hives to orchards for pollination services during winter, just prior to crop bloom and other forms of spring forage. In these conditions (e.g., almond orchards), bee colonies are in high density but have few natural resources. Without pollen to feed brood, honeybee colonies struggle to grow quickly enough to perform sufficient pollination services to crops. Furthermore, crops are often monocultures. Monocultures may provide pollen, but this pollen is unlikely to be a complete source of essential nutrients needed for growth and maintenance of honeybees.

Honeybees and other bee species collect pollen from flowers to obtain protein, fats, sterols, vitamins, and minerals. They also collect floral nectar, aphid honeydew, and other sugar sources like tree sap to provide them with carbohydrates. Both adult and larval stages depend on pollen and nectar for nourishment. Their metabolism is biased very strongly towards the need for carbohydrates and they also have unique needs for dietary sterols which are not common to other insects outside of the Hymenoptera.

Researchers have studied bee nutrition for over 100 years, but no one has been able to replicate the nutrition provided by multiple and diverse sources of floral pollen collected by naturally foraging honeybees. The most common way to feed honeybees during periods when they cannot obtain sufficient pollen is to add pollen substitutes to the colony in the form of a patty or a solution. These substitutes are typically composed of plant (e.g. soy or corn gluten) and/or animal proteins (e.g. whole eggs), oils, and brewer's yeast.

Most pollen supplement or substitute formulations are unpalatable to bees and provide inadequate nutrition. For this reason, existing supplements require the addition of floral, bee-collected pollen to make them attractive and usable for long periods of time. There are other problems with pollen substitutes added to honeybee colonies. For example, these mixtures also contain chemical compounds that are toxic or have negative impacts on honeybee metabolism. In addition, many bee food formulations contain proteins and other compounds that bees cannot digest. Furthermore, some commercially available formulations contain very high concentrations of protein which have been shown to reduce worker bee lifespan. Indeed, the negative impact of feeding honeybees with incorrectly formulated pollen substitutes in commercial beekeeping operations has been argued as one of the contributing factors to colony losses in the USA and elsewhere in the world. These supplements may also cause poor foraging performance and, therefore, inadequate pollination services in the bees that survive.

Bumblebee colony producers exclusively use honeybee collected pollen pellets as their source of pollen for colony production. This makes the bumblebee production industry entirely reliant on a food source collected by foraging honeybee colonies. Problems with this include the potential exposure of bumblebees to parasites and pathogens that infect honeybee colonies. It also means that bumblebee producers have little control over the quality of the food they provide.

It is an aim of aspects of the present invention to at least partially mitigate the problems associated with the prior art.

It is an aim of certain embodiments of the present invention to provide a composition which supplies insects e.g., honeybees, with all or substantially all of the nutrients required for survival, health, development and best foraging performance.

It is an aim of certain embodiments of the present invention to provide a composition which is a pollen supplement.

It is an aim of certain embodiments of the present invention to provide a composition which is a pollen substitute.

SUMMARY OF CERTAIN EMBODIMENTS OF THE INVENTION

The composition of certain embodiments of the present invention includes a mixture of macronutrients and micronutrients as found in naturally-occurring floral pollen that provides the correct balance of nutrients for honeybees. In certain embodiments, the pollen substitute provides a source of nutrition that does not require the addition of floral pollen to make it palatable to bees, to sustain brood production, and provide them with key nutrients and their combinations that result in best foraging performance. This combination of traits—palatability, brood production, and ideal foraging and cognitive function—will hitherto be referred to as 'improved bee performance.' In certain embodiments, the present invention provides a pollen substitute for use in honeybee colonies as a replacement for floral pollen.

In certain embodiments, the present invention provides a pollen supplement for use in honeybee colonies as an additive to floral pollen.

Certain embodiments of the invention specifically define the ratios of macronutrients and micronutrients that enable improved bee performance. Aptly, certain embodiments provide the proportions of proteins (amino acids), carbohydrates, and fats required by honeybees. Certain embodiments of the present invention also provide the amounts of essential amino acids and non-essential amino acids, carbohydrates, and fatty acids and the relative proportions of these classes of macronutrients needed for optimal performance in bee colonies.

In a first aspect of the present invention, there is provided a composition for providing nutrition to bees, the composition comprising:
 a) at least one component which is a source of protein (P);
 b) at least one component which is a source of one or more fatty acids (FA); and
 c) at least one component which is a source of one or more carbohydrates (C), wherein the ratio of the source of protein and the source of one or more fatty acids in the composition is between about 1 (protein):10 (fatty acid) w/w and about 20 (protein):1 (fatty acid) w/w.

In certain embodiments, the ratio of the source of protein and the source of one or more fatty acids in the composition is between about 1 (protein):5 (fatty acid) w/w and about 20 (protein):1 (fatty acid) w/w. In certain embodiments, the ratio of the source of protein and the source of one or more fatty acids in the composition is between about 1 (protein):1 (fatty acid) w/w and about 20 (protein):1 (fatty acid) w/w.

In certain embodiments, the source of one or more fatty acids may be a source of fat. The source of fat may be a single component or a combination of components.

In certain embodiments, the composition comprises a component or plurality of components which is/are a source of essential fatty acids, linoleic acid (LA) and α-linolenic acid (ALA). In certain embodiments, the composition comprises linoleic acid and α-linolenic acid in a ratio of between about 5:1 (linoleic acid:α-linolenic acid) to 1:10 (linoleic acid:α-linolenic acid). Aptly, the composition comprises a low ratio of linoleic acid:α-linolenic acid. In certain embodiments, the ratio about 3:1 (linoleic acid:α-linolenic acid) to 1:3 (linoleic acid:α-linolenic acid). Aptly, the composition comprises a low ratio of linoleic acid:α-linolenic acid.

In certain embodiments, the ratio of the component which is a source of protein and the component which is a source of carbohydrate is between about 2 (protein):1 (carbohydrate) and about 1 (protein):10 (carbohydrate).

Further details of the composition are provided below.

In a second aspect of the present invention, there is provided a product for providing nutrition to bees comprising a composition according to the first aspect of the present invention, wherein the product is solid. Aptly, the composition is:
 i) moist;
 ii) baked; and/or
 iii) powdered.

In a third aspect of the present invention, there is provided a product for providing nutrition to bees comprising a composition according to the first aspect of the present invention, wherein the product is a liquid.

In a fourth aspect of the present invention, there is provided a method of providing nutrition to a bee comprising:
 a) providing a composition according to the first aspect of the present invention or a product according to the second and/or third aspects of the present invention to a bee, wherein the bee is comprised in a colony of bees.

In a fifth aspect of the present invention, there is provided a method of reducing bee mortality comprising;
 a) providing a composition according to the first aspect of the present invention or a product according to the second and/or third aspects of the present invention to a bee, wherein the bee is comprised in a colony of bees.

BRIEF DESCRIPTION OF THE FIGURES

Embodiments of the present invention will now be described hereinafter, by way of example only, with reference to the following figures:

FIG. 3 comprising In FIG. 3a, individual adult worker bumblebees were fed with a diet composed of carbohydrate (sucrose), protein (sodium caseinate), and fat (lecithin) for 7 days. Fewer bees survived on diets with a high proportion of fat; the optimal proportion (in solid red) was 10:1 (P:FA). N=15 per diet.

In FIG. 3b, adult worker honeybees (0-10 days old) self-select diets that are 1:2.8 protein-to-fat when the diets are composed of free amino acids and lecithin and the protein-to-carbohydrate ratio is 1:25. The diets were composed of protein in the form of free amino acids and fat in the form of lecithin. N=15 cohorts of 30 bees per diet.

FIG. 3c shows that adult worker honeybees (0-10 days old) survive well on diets that range over 1:0-1:5 parts protein-to-fat, but have lower survival when the diets are biased towards high fat (1:10 or greater). Particularly, newly-emerged adult worker honeybees survive well on diets proportionally high in fat, as long as the amount of fat is >1:10 protein-to-fat. N=15 cohorts of 30 bees per diet.

FIGS. 6A to 6H are graphs illustrating the effect of various minerals and their concentration in the diet of bees on adult worker honeybee survival. Minerals, metals and salts in food are essential nutrients and affect bee survival but they must be placed in food at concentrations that do not kill bees. The dashed line represents the control diet treatment and coloured (paler) line the highest mineral salt concentration tested. Each concentration (in ppm) was tested on N=15 cohorts of 25 bees.

DETAILED DESCRIPTION OF EMBODIMENTS OF THE INVENTION

Figure 1:
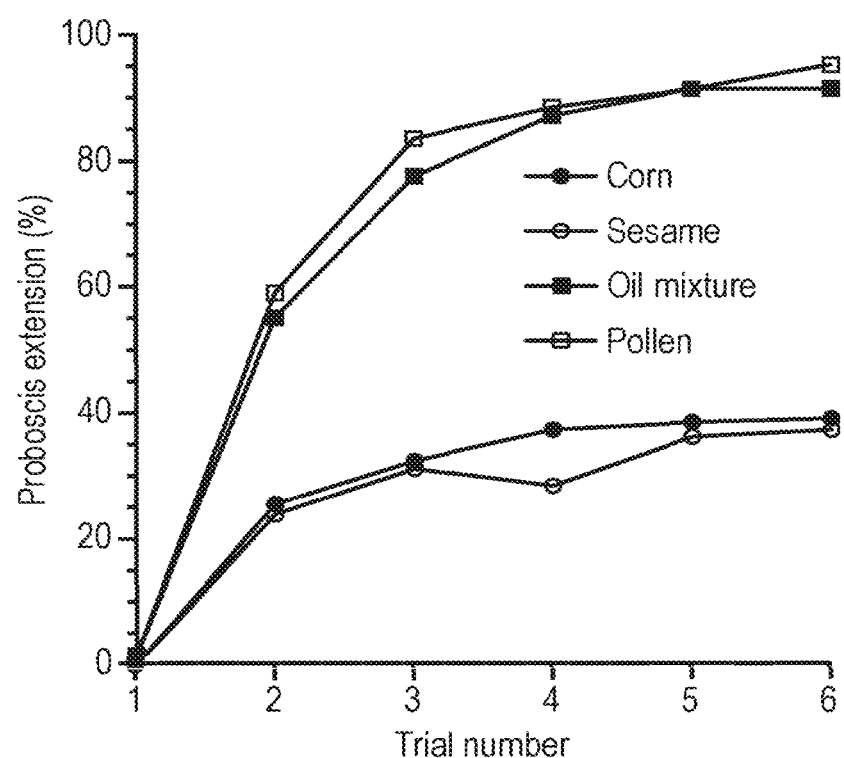
FIG. 1 is a graph showing the learning performance results of honeybees fed one of four diets.
Figure 2:
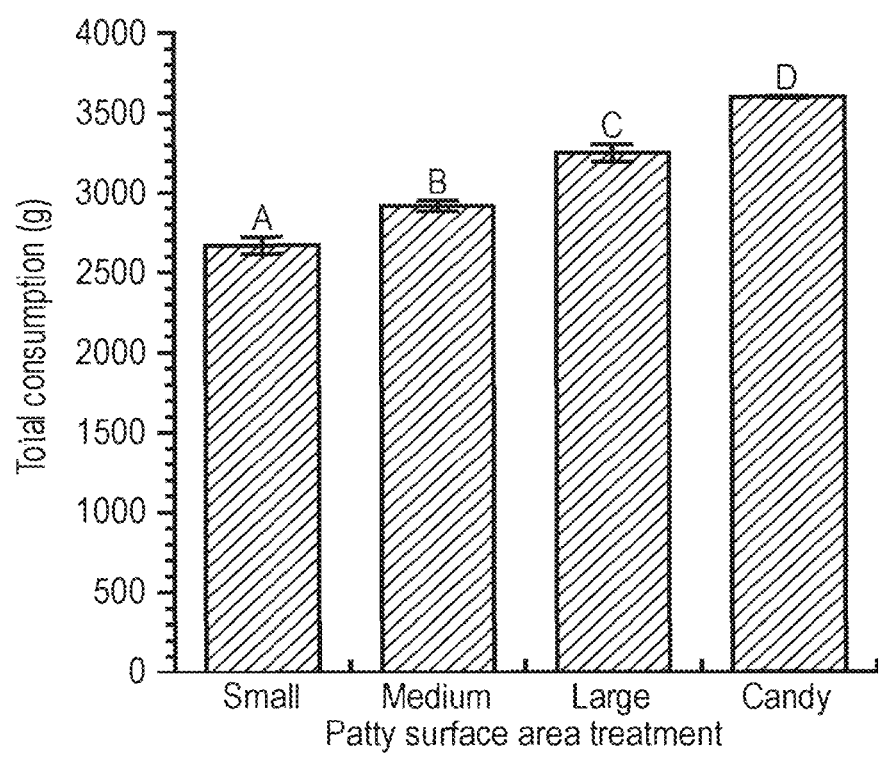
FIG. 2 is a graph showing that biscuit size can affect the amount of the food consumed by honeybees within hives. Small, medium, and large pollen supplement patties had dimensions of small (100×100×23 mm), medium (141×141×11.5 mm) and large (200×200×5.8 mm), respectively. Food consumption of the patties was measured on a weekly basis over 6 weeks. Of the pollen supplement patties, the large surface area patty was consumed most. Candy refers to a formulation of sucrose only.
Figure 3A:
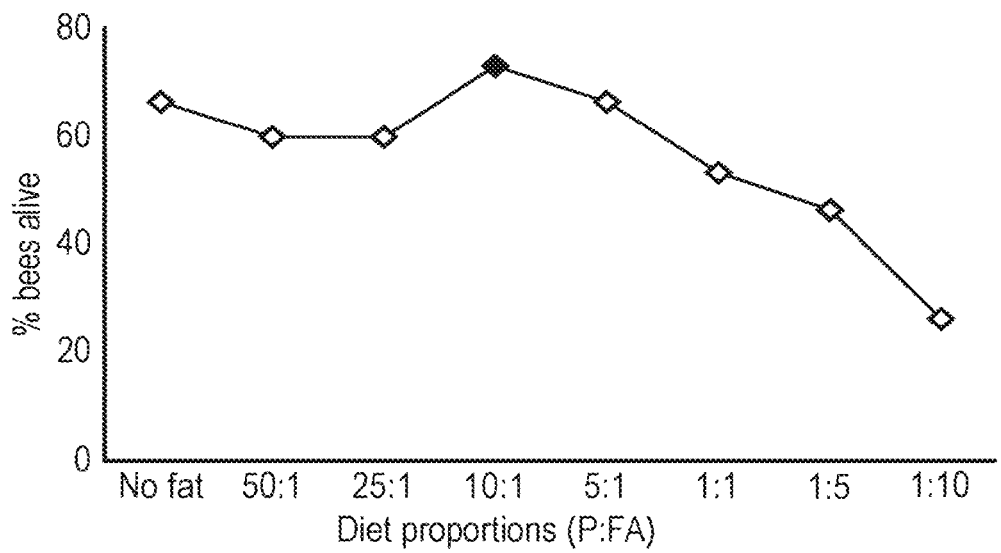
FIGS. 3a, 3b, and 3c, are graphs showing that the proportion of protein-to-fat (P:FA) in diet affects survival and food consumption of adult bees.
Figure 3B:
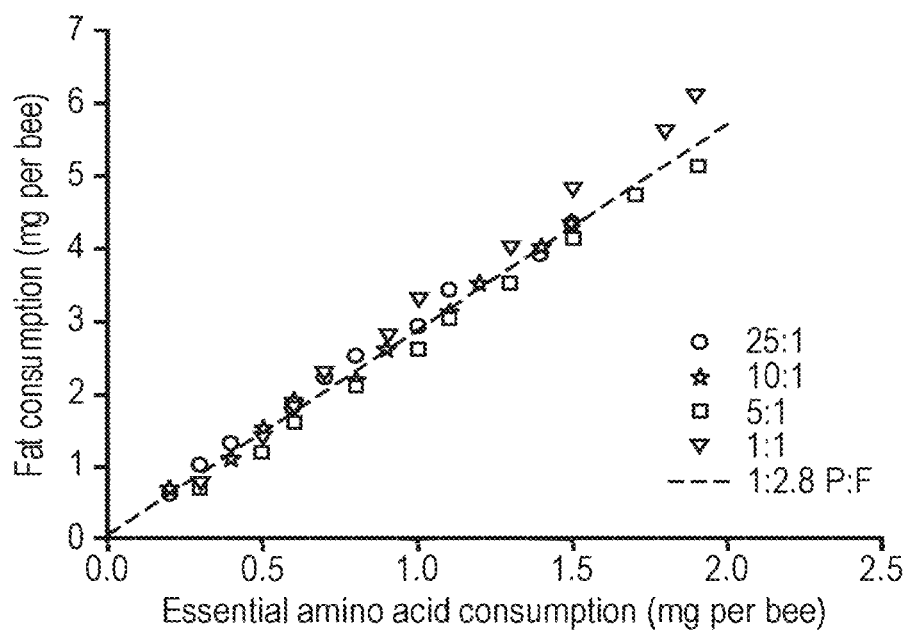
Figure 3C:
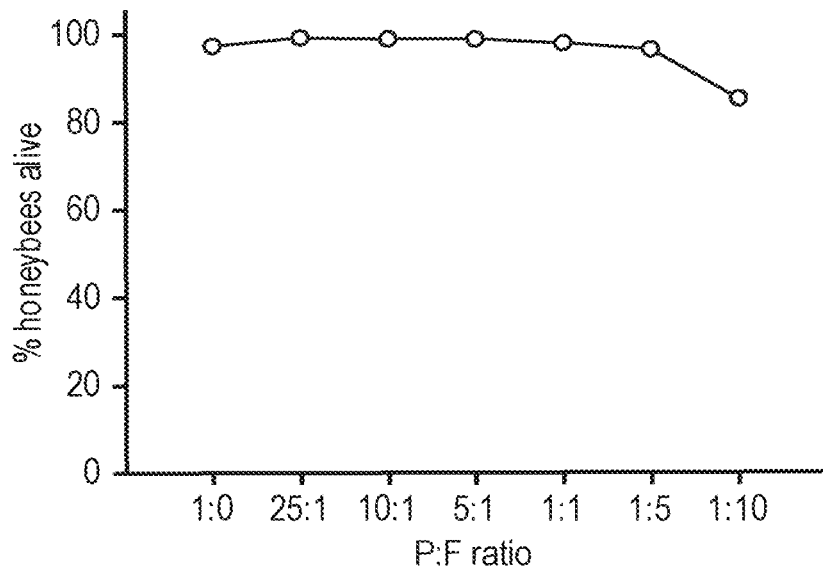
Figure 4:
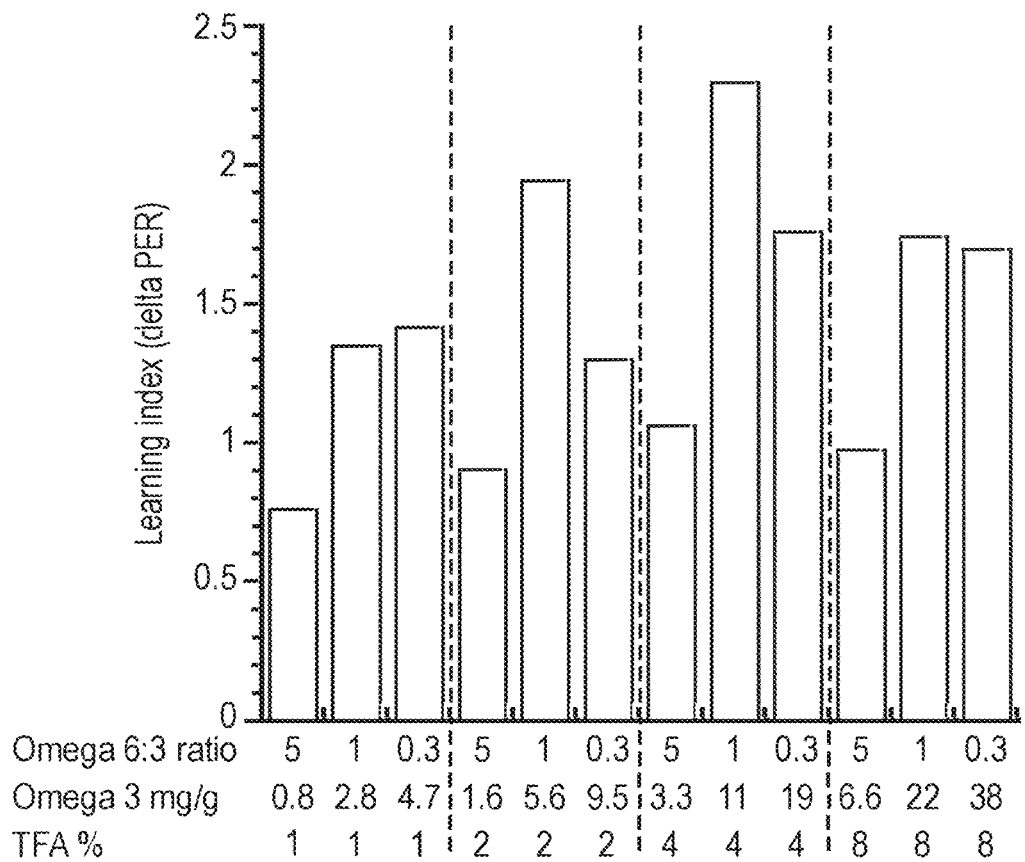
FIG. 4 is a graph showing the learning performance results of honeybees fed one of 12 diets. Newly emerged bees were kept in groups of five in a petri dish with ad lib access to three feeders containing one of the diets, honey, and water. The amount of flax and corn oil in the diets was varied so that the diets contained between 0.8 and 38 mg/g omega-3 (ALA) and between 4 and 33 mg/g omega-6 (LA). The total fatty acid proportion of the diet was either 1, 2, 4, or 8%, and the omega-6:3 ratio was either 0.33, 1, or 5. After one week bees were tested in an olfactory proboscis extension response discrimination conditioning assay. The learning index (delta PER) is the difference between the number of responses to the odor associated with an appetitive (sugar) reward minus the number of responses to the odor associated with an aversive (salt) reward during the last three of six conditioning trials of every subject. The x-axis shows the composition of each diet in terms of omega-6:3 ratio, omega-3 amount (mg FA per g diet), and total fatty acid (TFA) percent of the diet. Better performance was achieved with omega-6:3 ratio of 1 or less, and TFA % of 2 or above, with the optimum being TFA % of 4 and omega-6:3 ratio of 1. These data support the importance of sufficient omega-3 in the diet, and the deleterious effect of too much omega-6.
Figure 5:
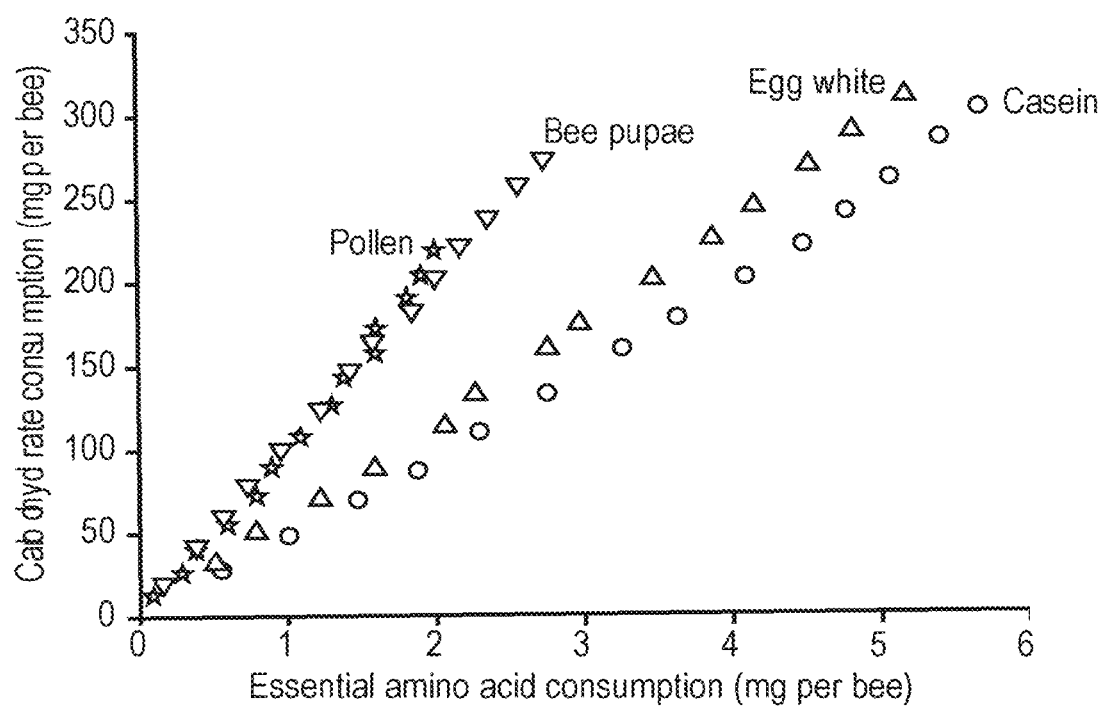
FIG. 5 is a graph that shows the ratio of essential amino acids found in diet affects the protein-to-carbohydrate ratio self-selected by cohorts of adult worker honeybees. Bees fed with diets containing only one protein that does not contain the correct proportions of essential amino acids will consume a diet proportionally higher in protein to meet their nutritional needs.
Figure 6:
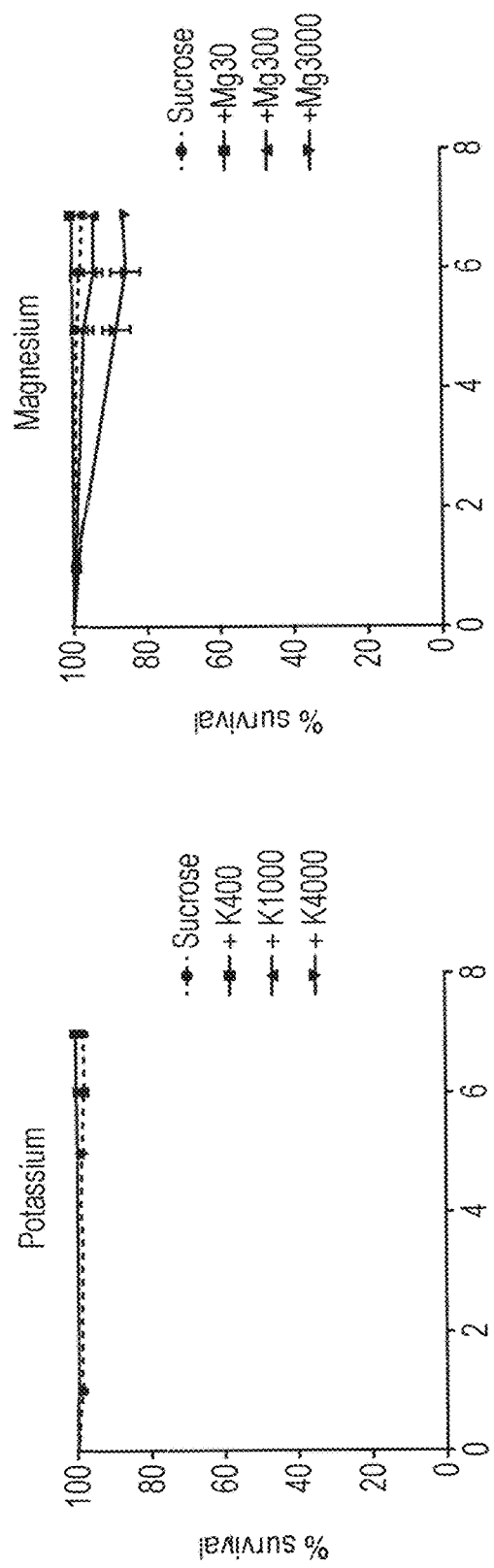
FIG. 6, comprising
Figure 6:
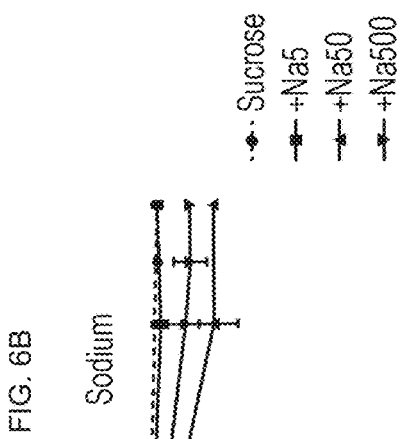
Figure 6:
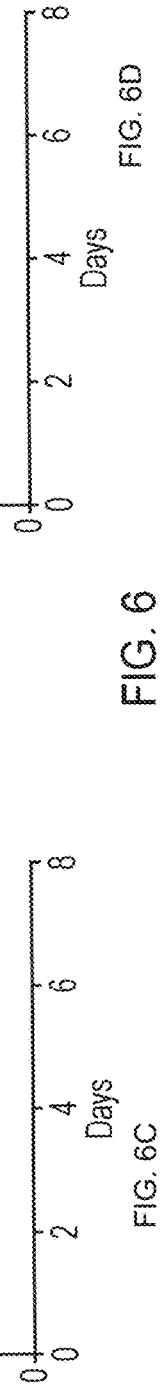
Figure 6:
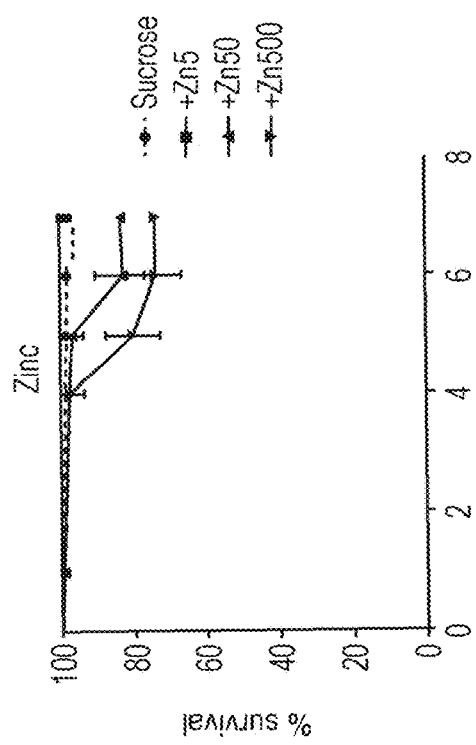
Figure 6:
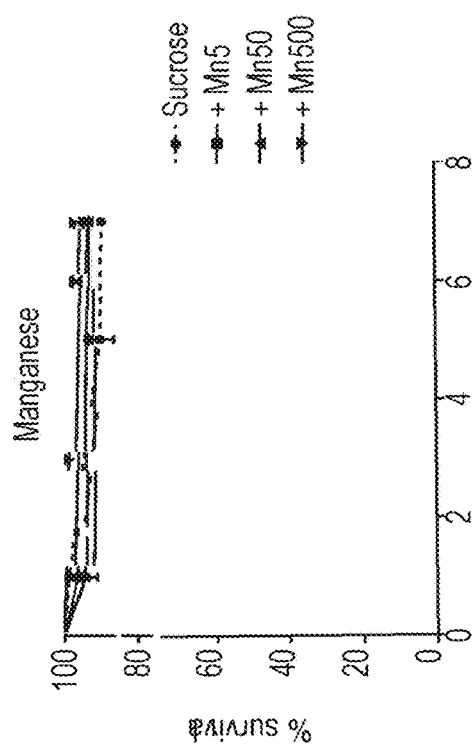
Figure 6:
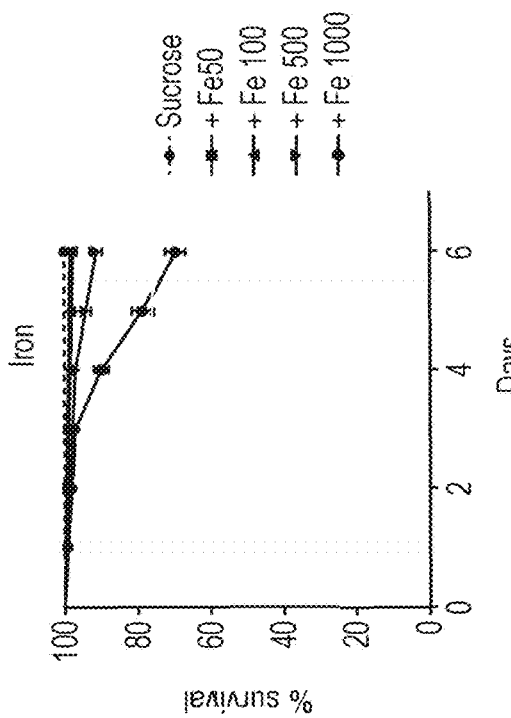
Figure 6:
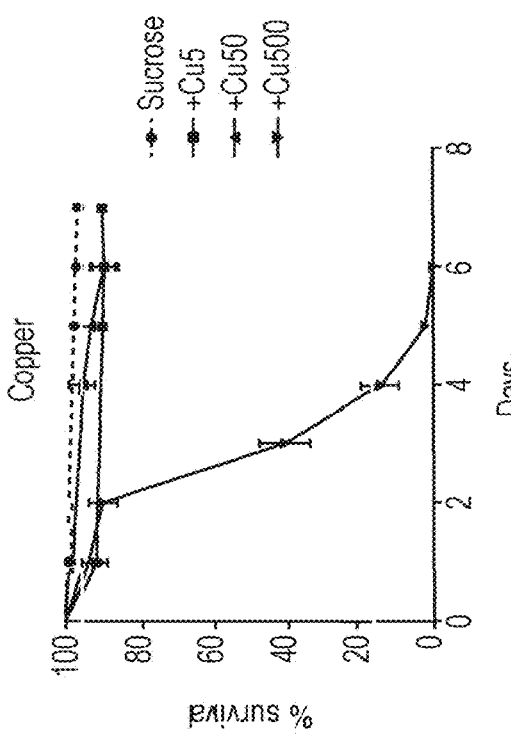

FIG. 1 is a graph showing the learning performance results of honeybees fed one of four diets Two diets had a high omega-6:3 ratio and contained either corn or sesame oil. Bees fed on these diets showed poor learning. Honeybees fed on one of two diets which had a low omega-6:3 ratio, and which contained an oil mixture comprising in addition to corn and sesame also sage and flax oils or a pollen mixture showed good learning. Percent proboscis extension (y-axis) describes the proportion of the bees in the assay that exhibited conditioned olfactory learning.

Details of diets, showing percent of each essential fatty acid of total fatty acids (TFA). The essential fatty acids comprise about 50% or more of TFA (composition of non-essential fatty acids not shown). Also shown is the omega-6:3 ratio.

TABLE 1

| Treatment Diet/FA | Corn | Sesame | Oil Mixture | Pollen |
|---|---|---|---|---|
| Omega-6 (% of TFA) | 53.85 | 46.08 | 41.82 | 21.41 |
| Omega-3 (% of TFA) | 4.56 | 3.63 | 19.47 | 59.41 |
| Omega-6:3 ratio | 11.81 | 12.69 | 2.15 | 0.36 |

Certain embodiments of the present invention relate to compositions which have utility in providing nutrients to insects such as, for example, bees.

The term 'bee' refers to members of the Family Apidae, Order Hymenoptera. A 'honeybee' refers to members of the eusocial group of bees that belong to the Genus *Apis*. For example, the domesticated honeybee is *Apis mellifera*. Aptly, the composition of certain embodiments of the present invention is for providing nutrients to members of the *Apis* genus. A bumblebee refers to the genus '*Bombus*'. For example, a domesticated species of bumblebee is the buff-tailed bumblebee, *Bombus terrestris*.

The term 'colony' refers to the collective group of eusocial bees that belong to the same family unit, i.e. that arise from the same queen. A 'colony' is composed of a single queen (and also her fertile daughters), sterile workers, brood (larvae/young bees), and males (drones). This unit lives together on combs constructed in the same location to rear brood that are the progeny of one queen. Single honeybee colonies are housed in 'hives' when domesticated. Certain embodiments of the present invention provide a composition for providing nutrition to a colony of bees e.g. a colony of honeybees.

A colony of bees may be reared in a hive. As used herein, the term 'hive' refers to the wooden structure used by professional beekeepers to rear a single colony of bees. Hives come in a variety of forms throughout the world including but not limited to: Langstroth hives, National Hives, WBC, Dadant, 'Commercial', Smith, Warre, Top Bar, Rose OSB, Dartington, Centenary. They are generally made of wood and characterized by removable frames upon which bees can build wax comb for rearing bee brood and storing honey and pollen.

As described herein, the composition of certain embodiments of the present invention comprises a mixture of macronutrients and micronutrients. Aptly, the composition provides a mixture of components which provides a correct balance of nutrients for bees e.g. honeybees. Aptly, the composition provides a pollen substitute which does not require the addition of floral pollen, including for example, bee collected pollen 'pellets', to make it palatable to bees and to sustain brood production.

Unless otherwise specified, references to percentages are by weight (wt %). Percentages of components in the composition of certain embodiments of the invention are based on the total dry weight of the composition.

In a first aspect of the present invention, there is provided a composition for providing nutrition to bees, the composition comprising:
a) at least one component which is a source of protein (P);
b) at least one component which is a source of one or more fatty acids (FA);
and
c) at least one component which is a source of one or more carbohydrates (C) wherein the ratio of the source of protein and the source of one or more fatty acids in the composition is between about 1 (protein):10 (fatty acid) w/w and about 20 (protein):1 (fattyacid) w/w.

In certain embodiments, the composition comprises a component or plurality of components which is/are a source of essential fatty acids, linoleic acid and (α-linolenic acid.

In certain embodiments, the ratio of the source of protein and the source of one or more fatty acids is between about 1 (protein):5 (fatty acid) w/w and about 20 (protein):1 (fatty acid) w/w.

In certain embodiments, the ratio of the source of protein and the source of one or more fatty acids is between about 1 (protein):1 (fatty acid) w/w and about 20 (protein):1 (fatty acid) w/w.

In certain embodiments, the ratio of the component which is a source of protein and the component which is a source of carbohydrate is between about 2 (protein):1 (carbohydrate) and about 1 (protein):10 (carbohydrate).

In certain embodiments, the ratio of protein:fats is between about 25:1 and 1:10. Aptly, the ratio of protein:fats is between about 1:5 and about 5:1.

In certain embodiments, the at least one component which is a source of carbohydrate provided in a concentration of between about 20% to about 90% by weight of the composition e.g. about 50% to about 90% by dry weight of the composition.

In certain embodiments, the ratio of protein:carbohydrate is between about 1:1 and about 1:5.

In certain embodiments, the composition comprises a high omega 3 fatty acid:omega 6 fatty acid ratio. In some embodiments, the composition comprises a ratio of omega 3 fatty acid:omega 6 fatty acid of about 1:1 to about 3:1. The fatty acids may be provided by one or more components in the composition.

The components of the composition of certain embodiments are described in more detail below:

In an embodiment, the composition comprises at least one component which is a source of protein.

Aptly, the composition further comprises at least one component which is a source of carbohydrate. Aptly, the composition further comprises at least one component which is a source of a lipid e.g. a fatty acid.

Thus, the composition provides macronutrients, e.g. protein, lipid and carbohydrate, in predetermined ratios.

In certain embodiments, the at least one component which is a source of protein is provided in a concentration of between about 10% and about 50% by total dry weight of the composition, e.g. about 10% and about 30% by dry weight of the composition.

For example, the composition may comprise 10%, 15%, 20%, 25%, 30%, 35%, 40%, 45% or 50% protein by total dry weight of the composition.

The component which is a source of protein may be selected from one or more of the following:
dehydrated egg white or isolate thereof;
fresh egg white or isolate thereof;
canola seed protein isolate;
soy protein isolate;
hemp protein isolate;
sodium and/or calcium caseinate;
bovine serum albumin;
pea protein isolate;
rice protein isolate;
spirulina protein isolate;
wheat gluten isolate;
oat protein isolate;
whey protein isolate;
fish meal; and
blood meal (from mammals); and
dehydrated egg yolk protein or isolate thereof.

Thus, in one embodiment, the composition comprises dehydrated egg white or an isolate thereof. Aptly, the composition comprises fresh egg white or an isolate thereof. In certain embodiments, the composition comprises canola seed protein isolate. Aptly, the canola seed protein isolate is Puratein® or Supertein®, both obtainable from Burcon Nutrascience. In one embodiment, the canola seed protein isolate is obtained from a commercial source such as for example Isolexx®, a protein product available from Teutexx proteins.

In certain embodiments, the composition comprises soy protein isolate and/or hemp protein isolate. Aptly, the hemp protein isolate is at least 70% protein (dry wt.)

Aptly, the soy protein isolate is ProFam 955® obtainable from ADM Foods & Wellness, Illinois. In certain embodiments, the oat protein isolate is PrOatein® obtainable from Tate & Lyle, London.

In certain embodiments, the component which is a source of protein is sodium caseinate or calcium caseinate. In an alternative embodiment, the composition comprises bovine serum albumin. Aptly, the composition comprises pea protein isolate. In certain embodiments, the composition comprises rice protein isolate and/or spirulina protein isolate and/or wheat gluten isolate.

In certain embodiments, dehydrated egg yolk may be obtained from commercially available sources.

Aptly, the composition comprises a plurality of components, each of which is a source of protein. It will be understood that if the composition comprises two or more components which each provides a source of protein, the total amount of protein will be provided in the composition in a concentration of between 10-50% by dry weight. In certain embodiments, the composition comprises two or more components which each provide a source of protein, the total amount of protein being in a ratio of between about 1:3 (protein:carbohydrate) and about 1:10 (protein:carbohydrate).

In certain embodiments, the total amount of protein may also be in a ratio of between about 5:1 to about 1:5 (protein:fatty acid). In some embodiments, the total amount of protein is in a ratio of between about 5:1 and about 10:1.

Each component will provide a predetermined essential amino acid profile. Aptly, the plurality 35 of components together provide a predetermined essential amino acid profile in the final product that approximates the amino acid profile seen in bee pupae (Table 1).

Table 2 shows essential amino acid profiles of certain components which may be comprised in the composition.

TABLE 2

Units are mg/g

| | Arq | Hist | Ile | Leu | Lys | Meth | Phe | Thr | Val |
|---|---|---|---|---|---|---|---|---|---|
| Bee Bread | 13.2 | 9.0 | 3.4 | 14.0 | 29.5 | 5.9 | 9.0 | 9.3 | 6.7 |
| Bee Pupae | 11.2 | 4.3 | 3.4 | 9.8 | 45.6 | 4.0 | 6.0 | 6.4 | 9.2 |
| Royal Jelly | 10.3 | 10.4 | 4.8 | 16.7 | 36.0 | 2.5 | 7.3 | 8.8 | 3.2 |
| Blood meal | 8.6 | 8.3 | 2.2 | 24.9 | 16.7 | 1.4 | 13.4 | 7.4 | 17.2 |
| BSA | 16.5 | 0.1 | 1.0 | 7.5 | 61.0 | 0.7 | 6.0 | 3.5 | 3.8 |
| Canola protein | 16.0 | 7.9 | 9.1 | 17.9 | 13.4 | 5.3 | 9.7 | 9.4 | 11.2 |
| Casein | 7.6 | 6.3 | 11.3 | 19.4 | 16.4 | 6.0 | 10.4 | 8.6 | 13.9 |
| Egg white | 11.3 | 4.7 | 9.8 | 16.2 | 12.7 | 10.6 | 11.4 | 9.4 | 13.9 |
| Fish meal | 14.5 | 5.2 | 9.7 | 16.6 | 17.3 | 6.5 | 8.6 | 9.7 | 11.8 |
| Hemp protein | 29.3 | 7.4 | 6.5 | 14.9 | 9.0 | 5.3 | 10.3 | 8.6 | 8.7 |
| Oat protein | 10.1 | 3.2 | 5.7 | 10.9 | 6.1 | 3.7 | 7.8 | 4.8 | 47.6 |
| Pea protein | 18.6 | 5.5 | 9.6 | 17.8 | 15.8 | 2.5 | 11.5 | 8.0 | 10.6 |
| Rice protein | 18.6 | 5.1 | 9.8 | 18.7 | 6.8 | 6.6 | 12.8 | 8.5 | 13.0 |
| Soy protein | 17.4 | 6.0 | 11.1 | 17.7 | 13.9 | 3.0 | 12.0 | 8.2 | 10.7 |
| Spirulina | 13.8 | 3.5 | 13.0 | 20.2 | 9.3 | 5.0 | 10.7 | 10.1 | 14.3 |
| Wheat gluten | 10.2 | 5.4 | 13.0 | 22.9 | 4.4 | 4.1 | 14.0 | 8.9 | 17.1 |
| Whey | 3.8 | 2.8 | 12.0 | 21.9 | 20.8 | 3.6 | 5.5 | 17.0 | 12.6 |

In certain embodiments of the present invention, the source of protein also provides tryptophan.

In certain embodiments, the composition comprises a combination of components which each provide a source of one or more amino acids. Aptly, the combination of components together provides a combination of amino acids which mimics the amino acids found in bee pupae. Aptly, the composition comprises a combination of components which together provide at least the following amino acids (as a percentage of the total essential amino acids):
a) approximately 10 to 15% arginine;
b) approximately 3 to 8% histadine;
c) approximately 1 to 5% isoleucine;
d) approximately 8 to 13% leucine;
e) approximately 40 to 50% lysine;

f) approximately 2 to 7% methionine;
g) approximately 3 to 8% phenylalanine;
h) approximately 4 to 9% threonine;
i) approximately 5 to 15% valine; and
j) approximately 5 to 10% tryptophan.

As noted above, the composition of certain embodiments of the present invention comprises at least one component which is a source of carbohydrate. Aptly, the composition comprises carbohydrate in a concentration of between about 20 to about 90% of the total dry weight of the composition. In certain embodiments, the composition comprises a total amount of carbohydrate in a ratio of between about 1:3 (protein:carbohydrate) to about 1:10 (protein:carbohydrate).

Aptly, the carbohydrate is provided in the composition at a concentration of between about 20% to about 90%, e.g. between about 50% and about 90% by weight. Aptly, the composition comprises 20%, 25%, 30%, 35%, 40%, 45%, 50%, 55% 60%, 65%, 70%, 75% 80%, 85% or 90% by weight of carbohydrate.

The carbohydrate may be provided by one or more components. Aptly, the carbohydrate is a mono-saccharide or a di-saccharide.

In certain embodiments, the at least one component which is a source of carbohydrate provides a carbohydrate selected from:
  a) sucrose;
  b) glucose;
  c) fructose;
  d) melezitose;
  e) sorbitol;
  f) mannitol;
  g) trehalose; and
  h) maltose.

Aptly, the composition comprises one or more of a carbohydrate selected from glucose, fructose and sucrose. In an embodiment, the composition comprises fructose, sucrose and a carbohydrate selected from glucose, melezitose and a sugar alcohol e.g. sorbitol and mannitol. In an embodiment, the composition comprises fructose, sucrose and glucose. In certain embodiments, the composition comprises maltose e.g. in combination with one or more of glucose, fructose or sucrose.

In certain embodiments, the at least one component which is a source of carbohydrate provides sucrose, fructose and a carbohydrate selected from glucose, melezitose, sorbitol and mannitol, wherein the composition comprises fructose and the carbohydrate selected from glucose, melezitose, sorbitol and mannitol in equal proportions. In certain embodiments, the at least one component which is a source of carbohydrate provides sucrose, fructose and glucose, wherein the composition comprises fructose and glucose in equal proportions.

In certain embodiments, the composition comprises sucrose, glucose and fructose (e.g. a ratio of about 0:1:1 to about 1:0:0, sucrose:glucose:fructose), wherein the composition comprises fructose and glucose in equal proportions. In certain embodiments, the composition comprises sucrose, glucose and fructose in a ratio of about 0.5:1:1 to about 3:1:1 (sucrose:glucose:fructose) wherein the composition comprises fructose and glucose in equal proportions.

In certain embodiments, the composition comprises sucrose, glucose and fructose between about 1:1:1 and about 3:1:1 (sucrose:glucose:fructose) wherein the composition comprises fructose and glucose in equal proportions.

Aptly, the composition comprises fructose, sucrose and a carbohydrate selected from glucose, melezitose and a sugar alcohol e.g. sorbitol and mannitol in a predetermined ratio. In an embodiment, the composition comprises fructose, sucrose and a carbohydrate selected from glucose, melezitose and a sugar alcohol e.g. sorbitol and mannitol in a ratio of between about O (sucrose):1 (glucose):1 (fructose) to about 1 (sucrose):O (glucose):O (fructose). Aptly, the composition comprises a ratio of sucrose:glucose:fructose of between about 0.5:1:1 to about 3:1:1.

Aptly, the composition comprises a ratio of sucrose: glucose:fructose of between about 1:0:0 to about 3:1:1, e.g. 1:1:1, 1.5:1:1, 2:1:1, 2.5:1:1 or 3:1:1. In certain embodiments of the invention, the composition comprises melezitose and/or a sugar alcohol e.g. sorbitol and/or mannitol in place of glucose.

In certain embodiments, the composition does not comprise a complex carbohydrate e.g. starch.

Aptly, the carbohydrate is provided by dried sucrose, glucose and/or fructose as a powder.

In an embodiment, the carbohydrate is provided by liquid sucrose, glucose and/or fructose.

In certain embodiments, the composition comprises at least one component which is a source of a fatty acid. Aptly, the composition comprises at least one component which is a source of an essential fatty acid. Aptly, the composition comprises one or more components which provide a source of two essential fatty acids.

It is considered that there are two essential fatty acids, linoleic acid (an omega-6 fatty acid) and α-linolenic acid (an omega-3 fatty acid). In certain embodiments, the composition comprises a component or plurality of components which provide both essential fatty acids. Thus, in certain embodiments, the composition comprises linoleic acid (LA) and α-linolenic acid (ALA).

Aptly, the composition comprises a plurality of components, each of which provide at least one fatty acid. In certain embodiments, the composition comprises a component which provides a plurality of fatty acids. In an embodiment, the composition comprises between about 1% and about 10% by weight of a fatty acid or mixture of fatty acids. The one or more fatty acids may be present in the composition in an amount of 1%, 2%, 3%, 4%, 5%, 6%, 7%, 8%, 9% or 10% by weight. In some embodiments, the composition comprises greater than about 2% by weight of total fatty acid. In some embodiments, the composition comprises greater than about 4% by weight of total fatty acid.

It is considered that the ratio of omega-3 and omega-6 fatty acids may be important in honey bee associative learning. Thus, in certain embodiments, the composition comprises a high omega 3 fatty acid:omega 6 fatty acid ratio and thus may improve honey bee learning and cognitive performance. In certain embodiments, the composition comprises components which provide a ratio of omega 3:omega 6 of less than 1:5, e.g. less than about 1:4, e.g. less than 1:3, e.g. less than 1:2 for example 1:1.

In certain embodiments, the composition comprises one or more components which provide a ratio of omega 3 fatty acid:omega 6 fatty acid of about 1:1 to about 3:1, for example 1:1 to 2:1.

It is considered that prior art compositions comprise a high omega-6:omega 3 ratio, which may have detrimental effects on bee learning i.e. greater than about 5:1 (omega 6:omega 3).

Aptly, the composition comprises linoleic acid and α-linolenic acid in a ratio of between about 5:1 (linoleic acid:α-linolenic acid) to 1:20 (linoleic acid:α-linolenic acid). In one embodiment, the composition comprises linoleic acid and α-linolenic acid in a ratio of between about 5:1 (linoleic acid:α-linolenic acid) to 1:10 (linoleic acid:α-linolenic acid).

In certain embodiments, the composition comprises linoleic acid and α-linolenic acid in a ratio of between about 2:1 to about 1:5 (linoleic acid:α-linolenic acid). Aptly, the composition comprises linoleic acid (LA) and α-linoleic acid (ALA) in a ratio of (LA:ALA) in the range of 2:1 or less.

Aptly, the composition further comprises a fatty acid selected from palmitic acid, myristic acid, lauric acid, tricosanoic acid and arachidic acid. In certain embodiments, the at least one component which is a source of one or more fatty acids (FA) further provides palmitic acid, and oleic acid and combinations thereof.

In certain embodiments, at least one component which is a source of protein is not derived from egg yolk or corn gluten. In certain embodiments, the composition is an aqueous composition.

The component which provides at least one fatty acid may be an oil e.g. canola oil, *Echium* sp. oil, borage oil, flaxseed oil, sage oil or hempseed oil or a mixture thereof. Dried lecithin from soy or sunflower can also be used as a source of fatty acids.

Aptly, the composition comprises at least one sterol. Insects require a dietary source of sterols; they cannot synthesize sterols but need them for lipid membranes and hormone biosynthesis. Bees acquire sterols from the pollen that they consume. Bees are unique because unlike other insects, they have specific dietary requirements for sterols. In particular, a dietary source of 24-methylene cholesterol (IUPAC name: ergosta-5,24(28)-dien-3β-ol) may be important (Svoboda et al. 1986.). Other sterols derived from pollen include campesterol, β-sitosterol, and cholesterol.

Aptly, the at least one sterol is present in the composition in an amount of about 0.01% to about 4%, e.g. 0.5%, 1%, 1.5%, 2%, 2.5%, 3%, 3.5% or 4%. In certain embodiments, the composition comprises a plurality of sterols. If more than one sterol is provided in the composition, the total combined amount of the plurality of sterols is aptly between about 0.01% and about 4% by weight of the composition. Aptly, the composition comprises one or more sterols in a total concentration of between about 0.5% and about 2% by dry weight of the composition.

At least one sterol may be selected from 24-methylene cholesterol, campesterol, β-sitosterol, and cholesterol or a combination thereof. In certain embodiments, the composition comprises 24-methylene cholesterol.

Aptly, the at least one sterol is a plurality of sterols, wherein the plurality of sterols comprises at least two sterols selected from 24-methylene cholesterol, campesterol, β-sitosterol and cholesterol. In certain embodiments, the composition comprises 24-methylene cholesterol, campesterol, β-sitosterol, and cholesterol. Aptly, the sterols are present in the composition in a ratio of between about 1:1:1:1 to 10:1:1:1 (24-methylene cholesterol:campesterol:β-sitosterol:cholesterol).

Sources of sterols for use in the composition of certain embodiments include for example, canola/oilseed rape oil, *Echium* sp. oil, borage seed oil, marine algae, marine organisms and other synthetic sources. Aptly, the composition comprises a component selected from canola/oilseed rape oil, *Echium* sp. oil, borage seed oil, and a component isolated from marine algae and a component isolated form a marine organism.

In one embodiment, the at least one component which is a source of a sterol is a sterol that has been extracted from one or more of the above sources.

In certain embodiments, the sterol is derived from addition of or extraction from *Echium* sp. Oil or *Borago officinalis* oil or other oils or marine organisms.

In certain embodiments, the composition comprises one or more vitamins and/or minerals. Bees have requirements for several vitamins which they typically obtain from pollen. Diets deficient in these vitamins can affect bee lifespan and performance. Additionally, bees require dietary sources of salts and metals, which they acquire from both nectar and pollen. However, too much of these micronutrients can harm bees.

In certain embodiments, the composition further comprises at least one vitamin. In certain embodiments, the at least one vitamin is selected from one or more of Vitamin B1, Vitamin B2, Vitamin B3, Vitamin B4, Vitamin B5, Vitamin B6, Vitamin B7, Vitamin B9, inositol, Vitamin A, Vitamin C, Vitamin E and choline. Aptly, the at least one vitamin is a plurality of vitamins, and wherein the plurality of vitamins is selected from two or more of Vitamin B1, Vitamin B2, Vitamin B3, Vitamin B4, Vitamin B5, Vitamin B6, Vitamin B7, Vitamin B9, inositol, Vitamin A, Vitamin C, Vitamin E and choline.

In certain embodiments, the at least one vitamin is provided in the composition in a concentration of between about 0.0001% to about 2% by dry weight of the composition, e.g. about 0.02% to about 1% by dry weight of the composition.

In certain embodiments, the composition comprises at least one mineral. Aptly, the at least one mineral is selected from zinc, iron, manganese, magnesium, copper, potassium, phosphorous, calcium and sodium. In certain embodiments, the at least one mineral is a plurality of minerals and wherein the plurality of minerals is selected from two or more of zinc, iron, manganese, magnesium, copper, potassium, phosphorous, calcium and sodium.

In certain embodiments, the at least one mineral is provided in the composition in a concentration of between about 0.05% and about 2% by dry weight of the composition, e.g. between about 0.05% and about 1% by dry weight of the composition.

Aptly, the composition comprises one or more vitamins and/or minerals selected from the vitamins and mineral listed in Table 3. Aptly, the vitamin and/or mineral is provided in the composition in an amount indicated in Table 3. For example, in certain embodiments, the composition comprises Vitamin B1 in an amount of between about 1 to 25 μg/g of the total dry weight of the composition.

TABLE 3

Vitamins and minerals

| Component | First range | Second Range | Third Range |
|---|---|---|---|
| Vitamins (ug/g) | | | |
| B1 (thiamin) | 1-25 | 6-20 | 6-20 |
| B2 (riboflavin) | 5-50 | 10-30 | 10-30 |
| B3 (niacin) | 50-350 | 100-300 | 100-300 |
| B4 (nicotinic acid) | 40-250 | 40-200 | 40-200 |
| B5 (pantothenic acid) | 100-600 | 300-500 | 300-500 |
| B6 (pyroxidine) | 2-50 | 2-30 | 2-30 |
| B9 (folic acid) | 5-600 | 5-20 | 5-20 |
| B7 (biotin) | 0.5-2 | 0.5-2 | 0.5-2 |
| B12 | 2-200 | 2-200 | 2-200 |
| Inositol | 2-2000 | 50-300 | 50-300 |
| A (retinal) | 0.5-10 | 0.5-10 | 0.5-10 |
| C (ascorbic acid) | 100-2000 | 150-600 | 150-600 |
| E (tocopherol) | 0.3-50 | 10-40 | 10-40 |
| Choline | 50-5000 | 500-5000 | 500-5000 |

TABLE 3-continued

Vitamins and minerals

| Component | First range | Second Range | Third Range |
|---|---|---|---|
| Minerals/Metals (mg/g) | | | |
| Zinc | 0.030-0.250 | 0.030-0.250 | 0.030-0.250 |
| Iron | 0.011-0.170 | 0.011-0.170 | 0.011-0.170 |
| Manganese | 0.020-0.110 | 0.020-0.110 | 0.020-0.110 |
| Magnesium | 0.7-1.48 | 0.7-1.48 | 0.7-1.48 |
| Copper | 0.002-0.016 | 0.002-0.016 | 0.002-0.016 |
| Potassium | 4-20 | 4-20 | 4-20 |
| Phosphorous | 0.8-6 | 0.8-6 | 0.8-6 |
| Calcium | 0.2-3 | 0.2-3 | 0.2-3 |
| Sodium | 0.006-0.6 | 0.006-0.6 | 0.006-0.6 |

In certain embodiments, the composition comprises at least one component which is a source of a phenolic compound. It is believed that phenolic compounds may improve palatability of the composition.

Aptly, the composition comprises at least one component which is a source of a carotenoid compound. Bee collected pollen contains a large variety of phenolic compounds (e.g. hydroxycinnamic acids and flavonoids) and carotenoid compounds made by plants. Some of these compounds are anti-oxidant and provide protection against free radicals. Phenolic compounds have been reported as a major component of the pollen of most species of plants and range in concentration from 0.025 to 25 mg/g dry weight and occasionally higher.

Aptly, the at least one phenolic compound is selected from a hydroxycinnamic acid and a flavonoid. Aptly, the phenolic compound is selected from rutin, quercetin, naringenin, ferulic acid, p-coumaric acid, caffeic acid and kaempferol.

In certain embodiments, the composition further comprises ferulic acid, p-coumaric acid, caffeic acid and kaempferol, wherein each of ferulic acid, p-coumaric acid, caffeic acid and kaempferol is provided in the composition at a ratio to rutin of 1:10.

Aptly, the composition comprises at least one phenolic compound selected from ferulic acid, p-coumaric acid, caffeic acid or their derivatives, or a flavonoid from quercetin, naringenin, kaempferol or their glycosides and combinations thereof.

In certain embodiments, the at least one phenolic compound is a plurality of phenolic compounds selected from two or more of rutin, quercetin, naringenin, ferrulic acid, p-coumaric acid, caffeic acid and kaempferol. Aptly, the composition comprises rutin, quercetin and naringenin in equal concentration.

In certain embodiments, the composition comprises kaempferol, quercetin and naringenin or their glycosides in equal ratios. Aptly, kaempferol, quercetin and naringenin or their glycosides are present in the composition in an amount of approximately 0.2% by weight.

In some embodiments, the composition further comprises p-coumaric acid, caffeic acid and a flavonoid glycoside. Aptly, each of the aforementioned phenolic compounds are provided in an amount which is approximately a tenth of the amount of rutin provided in the composition. Aptly, p-coumaric acid, caffeic acid or their derivatives and the flavonoid glycoside are each provided in an amount of approximately 0.02% by weight.

In certain embodiments, the composition further comprises a component which is a source of a carotenoid compound. Exemplary carotenoid compounds include for example lutein, β-cryptoxanthin and β-carotene. Aptly, the at least one carotenoid compound is selected from lutein, β-cryptoxanthin, and β-carotene. Aptly, the composition comprises lutein, β-cryptoxanthin, and β-carotene. Aptly, the lutein, β-cryptoxanthin, and β-carotene are provided in the composition in equal respective amounts to a total amount of about 0.2 mg/g (0.002% by weight).

Aptly, the composition comprises lutein, β-cryptoxanthin, and β-carotene. In certain embodiments, each carotenoid compound is provided in the composition in a concentration which is equal to a concentration of one or more respective other carotenoid compounds.

In certain embodiments, the composition comprises at least one scent compound.

Most pollens emit a scent in the form of aldehyde and ketone fatty acid derivatives, mono and sesquiterpenes, or phenolics such as benzaldehyde and eugenol (Dobson and Bergstrom, 2000). Some of these compounds are attractive to foraging bees and indicate the presence of pollen. These compounds are also found in honey produced by bees.

Aptly, the at least one scent compound is selected from eugenol, phenylacetaldehyde, linalool, furfural, β-carophyllene, β-damascenone and 1-hexanol. Aptly, the at least one scent compound is a plurality of scent compounds selected from two or more of eugenol, phenylacetaldehyde, linalool, furfural, β-carophyllene, β-damascenone and 1-hexanol. In certain embodiments, each of the one or more scent compounds is provided in a concentration which is equal to a concentration of one or more respective other scent compounds.

In certain embodiments, the one or more scent compounds are provided in the composition in a total amount of about 0.001% of the final dry weight of the composition.

In other embodiments, the composition may further comprise one or more additional essential oils including for example neroli oil and/or orange or rose flower water extractions. Such extractions are commercially available.

In one embodiment, the composition further comprises water. The amount of water added to the composition will depend on the specific embodiment of the composition and the components provided in the composition.

In certain embodiments of the present invention, the composition further comprises glycerol. The composition of certain embodiments of the present invention may therefore comprise a plurality of components in predetermined ratios and amounts. Aptly, the composition comprises a plurality of components selected from:

a) a source of protein;

b) a source of carbohydrate;

c) a source of fatty acids, wherein aptly the fatty acids are provided in a ratio of 5:1 (omega 6 fatty acid:omega 3 fatty acid) to 1:20 (omega 6 fatty acid:omega 3 fatty acid);

d) a source of a sterol;

e) a source of one or more vitamins and/or minerals;

f) a source of one or more phenolic compounds;

g) a source of one or more carotenoids; and h) a source of one or more scent compounds.

In one embodiment, the composition comprises the components listed in Table 4 below:

TABLE 4

Recipe for dry ingredients

| Component | First range | Second Range | Third Range |
|---|---|---|---|
| Carbohydrate | 20-90% | 50-90% | 50-90% |
| Suc:gluc:fruct | 0:1:1 to 1:0:0 | 1:0.5:0.5 to 3:1:1 | 1:0:0 to 3:1:1 |
| Protein | 10-50% | 10-30% | 10-30% |
| Fatty acids | 1-30% | 1-10% | 1-8% |
| LA:ALA | 5:1 to 1:20 | 2:1 to 1:10 | 1:1 to 1:10 |
| Sterols | 0%-4% | 0.5-2% | 0.5-2% |
| 24M:CMP:CHO:BST | 1:1:1:1 to 10:1:1:1 | 1:1:1:1 to 10:1:1:1 | 1:1:1:1 to 10:1:1:1 |
| Vitamins | 0.001-2% | 0.02-2% | 0.02-1% |
| Minerals | 0.05-6% | 0.05-1% | 0.05-1% |
| Phenolics | 0-12% | 1-8% | 2-5% |
| Carotenoids | 0-0.05% | 0.007-0.05% | 0.007-0.05% |
| Scent | 0-0.05% | 0.001-0.05% | 0.001-0.05% |

All are % dry weight of mixture.
Note:
this table does not include water. Amount of water added to final formulation is determined by specific embodiments of the invention.
LA = linoleic acid,
ALA = α-linolenic acid
24M = 24-methylene cholesterol,
CMP = campesterol,
CHO = cholesterol,
BST= β-sitosterol In certain embodiments, a product comprising the composition may be prepared as follows:

Method 1

As a first step, all dry ingredients are combined. Subsequently, oils e.g. oils which are components which provide one or more fatty acids and/or one or more sterols are mixed together. These are then cut into the dry ingredients using a blending method to render a fine crumb. Finally, water should be added to yield a dry, slightly sticky dough. The dough can then be shaped into patties. In certain embodiments, glycerol may be added to keep the patties moist and easy for bees to consume.

Aptly, the composition is formulated into a "raw" i.e. non-baked product.

Method 2

As a first step, all dry ingredients are combined together with a portion of the carbohydrates. Aptly, a third of the carbohydrate is added to the dry components.

Baking powder and baking soda (sodium bicarbonate) is then added to the dry component/carbohydrate material. Approximately, fifteen grams of baking powder and fifteen grams of baking soda (sodium bicarbonate) may be added to every 400 grams of dry component material.

In a subsequent step, components which are oils e.g. oils which provide fatty acids and sterols should be mixed together, then cut into the dry ingredients using a blending method to render a fine crumb. 100 ml of water is added to every 400 g of dry material and mixed thoroughly. The resulting batter is placed in a pan to approximately 1-2.5 cm deep and baked for 40-60 min at 120° C.

After baking, the resulting biscuit is removed from the oven and holes should be pricked in the surface. While the biscuit is still warm, 60% sugar syrup is poured over it, covering the entire surface and saturating the biscuit.

Aptly, the composition is provided as a baked product e.g. a biscuit. In certain embodiments, the patty or biscuit has a large surface to volume ratio. For example, the patty or biscuit may have dimensions of 200 mm×200 mm×6 mm.

The composition according to certain embodiments of the present invention may be used to supply nutritional support to a bee. Aptly, the bee may be in a colony of bees e.g. in a hive.

Aptly, the composition increases honey production by a colony of bees fed on the composition. Aptly the composition is fed to a colony of bees in the absence of pollen.

Aptly, the composition is fed to a colony of bees as a supplement to naturally available pollen. In certain embodiments, the composition is a liquid.

The composition may be fed to a colony of bees in a variety of ways. For example, the composition may be a liquid and fed within a hive in a horizontal feeder in place of a comb. Alternatively, or in addition, the composition may be placed in a vertical feeder which is in turn placed on top of a comb within the hive. The composition may be a liquid, a patty or a biscuit.

In certain embodiments, the composition is provided adjacent to a comb in the hive e.g. on top of the comb. Aptly, the composition is provided on a mesh through which the bees can pass. The composition may be a liquid, a patty or a biscuit.

In certain embodiments, the composition is provided in an inverted jar inserted into a hole in the roof of a hive. Aptly, the composition is liquid.

In certain embodiments, the composition may be provided in an area surrounding a hive (within an apiary). Thus, the bees may eat the composition as part of their foraging. Aptly, the composition may be in the form of a liquid or a powder.

EXAMPLES

Example 1

The composition is tested on nucleus honey bee colonies.
Methods. Feeding assays with whole colonies of bees.
Nucleus honey bee colonies containing 4-5 frames of bees, including two frames with brood, can be placed separately in netted enclosures (2.5×4×2 m) according to a randomized block design. The hives may be placed inside the enclosures for a week without additional food in order to finish their pollen reserves. Then each hive can forage from a dish in the enclosure that contained 30 g of a composition according to certain embodiments of the present invention every day, and leftover food from the day before can be removed and weighed. Each hive may have inside the enclosure ad lib access to 30-50% sucrose solution and fresh water. All hives are inside the enclosures for eight weeks.

In an alternative embodiment, the composition may be supplied to individual bees as described below:

Method 1. Individual Bee Tests.

To measure the food consumption and behaviour of individual bees the methods previously published in Stabler et al. (2015) may be used. In summary, bees can be housed individually in a plastic box (16.5×11×6.5 cm) with 20 holes (2 mm) drilled at each end of the lid for ventilation. In three sides of the box, a hole can be cut to insert a 2 ml microcentrifuge tube; each tube may have four holes (2 mm) drilled in a line in one side of the tube to facilitate feeding by the bees.

Two of the tubes may be filled with a liquid composition according to certain embodiments of the present invention; the remaining tube can then be filled with deionised water. A piece of absorbent laboratory paper may be added to the housing box, covering the base. After being placed in the box, bees are left to acclimatise at room temperature before the feeding solutions are added. Bees may then be moved into the 28° C. controlled temperature room or incubator and kept in darkness for 7 days, through the course of the experiment. After use in treatments, bees are frozen at −20°

C. to euthanize. Each tube containing the solution is weighed before being placed in the arena and 24 h afterwards.

A further alternative method to determine food consumption and behaviour of bees is as follows:

Method 2. Cohorts of Bees.

To measure the feeding and survival of groups of bees, methods previously published in Paoli et al. (2014) can be used. In short, newly-emerged honeybees are collected from frames and 20-30 bees placed in a Perspex box (11×6×20 cm). The boxes are placed in a constant temperature room at 34° C. and 60% relative humidity.

Experiments continue for 7-14 days. The number of dead bees in each box is counted daily to measure survival. Bees may be fed using feeding tubes consisting of 2 ml microcentrifuge tubes (four 3 mm holes were drilled along the top of each tube). Four feeding tubes are filled with a solution comprising a composition according to certain embodiments of the present invention; each box also has a water tube. In the case of solid compositions according to certain embodiments of the present invention, bees can be fed with modified microcentrifuge tubes. Each tube may contain a 1 cm×2 cm hole cut on the top surface. Food can be dried in an oven at 40 C, and then packed into the tube, the tube weighed, and then placed in the rearing box for 24 h. After 24 h, each tube may be placed in the 40° C. oven for 24 h, and the tube was reweighed.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for increasing honeybee performance, comprising:
   administering to a bee a pollen substitute composition, the bee pollen substitute comprising:
   (1) by weight of dry ingredients:
      a. 20 to 90 wt % of carbohydrates;
      b. 10 to 50 wt % of protein;
      c. 1 to 30 wt % of fatty acids, including linoleic acid and α-linolenic acid; and
      d. between about 0.01% to 4.0% by dry weight of a composition of sterols, comprising: 24-methylene cholesterol; and at least two sterols from the group consisting of: campesterol, β-sitosterol and cholesterol; and
   2. water.

2. The method according to claim 1, wherein the composition further comprises at least one vitamin, wherein:
   (a) the at least one vitamin is selected from Vitamin B1, Vitamin B2, Vitamin B3, Vitamin B4, Vitamin B5, Vitamin B6, Vitamin B7, Vitamin B9, inositol, Vitamin A, Vitamin C, Vitamin E, choline and combinations thereof;
   (b) the at least one vitamin is a plurality of vitamins selected from two or more of Vitamin B1, Vitamin B2, Vitamin B3, Vitamin B4, Vitamin B5, Vitamin B6, Vitamin B7, Vitamin B9, inositol, Vitamin A, Vitamin C, Vitamin E and choline; or
   (c) the at least one vitamin is provided in the composition in a concentration selected from between about 0.0001% to about 2% by dry weight of the composition and between about 0.02% to about 1% by dry weight of the composition.

3. The method according to claim 1, wherein the composition further comprises at least one mineral, wherein:
   (a) the at least one mineral is selected from zinc, iron, manganese, magnesium, copper, potassium, phosphorous, calcium and sodium;
   (b) the at least one mineral is a plurality of minerals selected from two or more of zinc, iron, manganese, magnesium, copper, potassium, phosphorous, calcium and sodium; or
   (c) the at least one mineral is provided in the composition in a concentration selected from between about 0.05% and about 2% by dry weight of the composition and between about 0.05% and about 1% by weight of the composition.

4. The method according to claim 1, wherein the composition further comprises at least one phenolic compound, wherein:
   (a) the at least one phenolic compound is selected from a hydroxycinnamic acid and a flavonoid;
   (b) the at least one phenolic compound is selected from rutin, quercetin, naringenin, ferulic acid, p-coumaric acid, caffeic acid and kaempferol; or
   (c) the at least one phenolic compound is a plurality of phenolic compounds selected from two or more of rutin, guercetin, naringenin, ferrulic acid, p-coumaric acid, caffeic acid and kaempferol, wherein:
      (i) the composition comprises rutin, quercetin and naringenin in equal concentration, or
      (ii) the composition comprises: rutin, guercetin and naringenin in equal concentration and ferulic acid, p-coumaric acid, caffeic acid and kaempferol, each provided in the composition at a ratio to rutin of 1:10.

5. The method according to claim 1, wherein the composition further comprises at least one carotenoid compound, wherein:
   (a) the at least one carotenoid compound is selected from lutein, β-cryptoxanthin, and β-carotene; or
   (b) the composition comprises lutein, β-cryptoxanthin, and β-carotene, each provided in the composition in a concentration which is equal to a concentration of one or more respective other carotenoid compounds.

6. The method according to claim 1, wherein the composition further comprises at least one scent compound, wherein:
   (a) the at least one scent compound is selected from eugenol, phenylacetaldehyde, linalool, furfural, β-carophyllene, β-damascenone and 1-hexanol;
   (b) the at least one scent compound is a plurality of scent compounds selected from two or more of eugenol, phenylacetaldehyde, linalool, furfural, β-carophyllene, β-damascenone and 1-hexanol;
   (c) the at least one scent compound is a plurality of scent compounds selected from two or more of eugenol, phenylacetaldehyde, linalool, furfural, β-carophyllene, β-damascenone and 1-hexanol and each scent compound is provided in a concentration which is equal to a concentration of one or more respective other scent compounds; or
   (d) the at least one scent compound is a plurality of scent compounds selected from two or more of eugenol, phenylacetaldehyde, linalool, furfural, β-carophyllene, β-damascenone and 1-hexanol, each scent compound is provided in a concentration which is equal to a concentration of one or more respective other scent compounds, and the total amount of the scent compounds are provided in the composition at a concentration of about 0.001% by dry weight of the composition.

7. The method according to claim 1, wherein
   (a) the composition further comprises at least one component which provides a source of protein is selected from: dehydrated egg white, fresh egg white, canola seed protein, soy protein, hemp protein isolate, sodium calcium caseinate, bovine serum albumin, pea protein isolate, rice protein isolate, spirulina protein isolate, wheat gluten isolate, oat protein isolate, fish meal (dried fish powder), whey protein, dried blood meal, and dehydrated egg yolk; or
   (b) the composition further comprises two or more components which provide a source of protein, wherein the two or more components are each independently selected from: dehydrated egg white or fresh egg white, canola seed protein, soy protein, hemp protein isolate, sodium calcium caseinate, bovine serum albumin, pea protein isolate, rice protein isolate, spirulina protein isolate, wheat gluten isolate, oat protein isolate, fish meal, whey protein, dried blood meal and dehydrated egg yolk.

8. The method according to claim 7, wherein:
   (a) the composition further comprises sucrose, glucose and fructose in a ratio of about 0:1:1 to about 1:0:0, sucrose: glucose: fructose, wherein the fructose and glucose are in equal proportions;
   (b) the composition further comprises sucrose, glucose and fructose in a ratio of about 0.5:1:1 to about 3:1:1 sucrose:glucose:fructose, wherein the fructose and glucose are in equal proportions; or
   (c) the composition further comprises sucrose, glucose and fructose between about 1:1:1 and about 3:1:1 sucrose: glucose: fructose, wherein the fructose and glucose are in equal proportions.

9. The method according to claim 1, wherein the bee is comprised in a colony of bees.

10. The method according to claim 1, wherein bee mortality is reduced and wherein the bee is comprised in colony of bees.

11. The method according to claim 1, wherein administering the composition increases palatability as compared to a composition that does not comprise at least one sterol.

12. The method according to claim 1, wherein administering the composition increases brood production as compared to a composition that does not comprise at least one sterol.

13. The method according to claim 1, wherein administering the composition increases foraging as compared to a composition that does not comprise at least one sterol.

14. The method according to claim 1, wherein administering the composition increases cognitive function as compared to a composition as compared to a composition that does not comprise at least one sterol.

15. The method according to claim 1, wherein administering the composition increases consumption as compared to a composition that does not comprise at least one sterol.

16. The method according to claim 1, wherein administering the composition increases survival as compared to a composition that does not comprise at least one sterol.

17. The method according to claim 1, wherein administering the composition increases bee size as compared to a composition that does not comprise at least one sterol.

18. The method according to claim 1, wherein administering the composition increases honey production as compared to a composition that does not comprise at least one sterol.

19. The method according to claim 1, wherein administering the composition increases biological fitness as compared to a composition that does not comprise at least one sterol.

20. The method according to claim 1, wherein the at least two sterols from the group consisting of: campesterol, β-sitosterol and cholesterol, further include: campesterol, β-sitosterol and cholesterol.

\* \* \* \* \*